United States Patent
Anantharam et al.

(10) Patent No.: US 9,804,907 B2
(45) Date of Patent: *Oct. 31, 2017

(54) REMOTE PROCEDURE CALL FOR A DISTRIBUTED SYSTEM

(71) Applicant: International Business Machines Corporation, Armonk, NY (US)

(72) Inventors: Sushma Anantharam, Cupertino, CA (US); Nirapada Ghosh, Sunnyvale, CA (US); Dayavanti Gopal Kamath, Santa Clara, CA (US); Keshav Govind Kamble, Fremont, CA (US); Dar-Ren Leu, San Jose, CA (US); Chandarani J. Mendon, San Jose, CA (US); Vijoy A. Pandey, San Jose, CA (US); Nandakumar Peethambaram, Santa Clara, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/072,897

(22) Filed: Nov. 6, 2013

(65) Prior Publication Data

US 2014/0067924 A1 Mar. 6, 2014

Related U.S. Application Data

(63) Continuation of application No. 13/585,587, filed on Aug. 14, 2012, now Pat. No. 9,378,073.

(51) Int. Cl.
*G06F 15/16* (2006.01)
*G06F 9/54* (2006.01)
(Continued)

(52) U.S. Cl.
CPC ........ *G06F 9/547* (2013.01); *H04L 29/08099* (2013.01); *H04L 67/40* (2013.01); *H04L 41/0213* (2013.01)

(58) Field of Classification Search
CPC ..... G06F 9/547; H04L 67/40; H04L 29/0617; H04L 41/04; H04L 41/044; H04L 4/0803
See application file for complete search history.

(56) References Cited

U.S. PATENT DOCUMENTS 5,569,084 A 10/1996 Nicastro et al.
5,822,563 A 10/1998 Sitbon et al.
(Continued)

OTHER PUBLICATIONS

Ghosh, et al., U.S. Appl. No. 13/364,947, filed Feb. 2, 2012; 46 pages.

(Continued)

*Primary Examiner* — Krista Zele
*Assistant Examiner* — Tariq Najee-Ullah
(74) *Attorney, Agent, or Firm* — Schmeiser, Olsen & Watts LLP (57) ABSTRACT

A distributed system includes first-tier entities, and a master entity in communication with each first-tier entity. The master entity provides a single access point through which an administrator can submit commands to manage all entities. The master entity maintains a table of virtual slots. Each virtual slot points to one of the first-tier entities, and each first-tier entity is pointed to by at least one virtual slot. The processor runs an RPC (remote procedure call) client to submit RPC requests to the first-tier entities, and determines a destination first-tier entity for a given RPC request in response to which virtual slot the administrator submits a command. The distributed system can include second-tier entities, each indirectly communicating with the master entity through a first-tier entity. The table has a virtual slot (Continued)

for each second-tier entity, which points to the first-tier entity acting as proxy for the second-tier entity.

7 Claims, 5 Drawing Sheets (51) Int. Cl.
H04L 29/08 (2006.01)
H04L 29/06 (2006.01)
H04L 12/24 (2006.01)

(56) References Cited

U.S. PATENT DOCUMENTS

| | | | |
|---|---|---|---|
| 5,881,230 A | 3/1999 | Christensen et al. | |
| 5,887,172 A | 3/1999 | Vasudevan et al. | |
| 6,006,230 A | 12/1999 | Ludwig et al. | |
| 6,088,659 A * | 7/2000 | Kelley | G01D 4/004 340/870.02 |
| 6,240,087 B1 | 5/2001 | Cummings et al. | |
| 6,314,460 B1 * | 11/2001 | Knight | G06F 3/0626 709/212 |
| 6,356,949 B1 | 3/2002 | Katsandres et al. | |
| 6,438,594 B1 * | 8/2002 | Bowman-Amuah | G06F 9/4428 709/203 |
| 6,487,607 B1 | 11/2002 | Wollrath et al. | |
| 6,760,903 B1 | 7/2004 | Morshed et al. | |
| 6,874,020 B1 | 3/2005 | Da Palma et al. | |
| 7,137,126 B1 | 11/2006 | Coffman et al. | |
| 7,206,805 B1 | 4/2007 | McLaughlin | |
| 7,523,469 B2 | 4/2009 | Bendapudi et al. | |
| 7,590,672 B2 | 9/2009 | Slik et al. | |
| 7,716,688 B2 | 5/2010 | Li et al. | |
| 7,958,199 B2 | 6/2011 | Ferrari et al. | |
| 8,082,153 B2 | 12/2011 | Coffman et al. | |
| 8,159,935 B1 * | 4/2012 | Fritz | H04L 41/0663 370/220 |
| 8,549,518 B1 | 10/2013 | Aron et al. | |
| 8,850,130 B1 | 9/2014 | Aron et al. | |
| 9,071,508 B2 * | 6/2015 | Anantharam | H04L 41/0246 |
| 2002/0065879 A1 | 5/2002 | Ambrose et al. | |
| 2003/0074418 A1 * | 4/2003 | Coker | G06F 9/547 709/217 |
| 2003/0154239 A1 | 8/2003 | Davis et al. | |
| 2004/0006653 A1 | 1/2004 | Kamen et al. | |
| 2004/0064351 A1 * | 4/2004 | Mikurak | 705/7 |
| 2004/0255017 A1 * | 12/2004 | Jurisch | G05B 19/042 709/223 |
| 2005/0021705 A1 * | 1/2005 | Jurisch | G05B 19/042 709/223 |
| 2005/0044197 A1 * | 2/2005 | Lai | G06Q 10/10 709/223 |
| 2006/0026123 A1 | 2/2006 | Moore et al. | |
| 2006/0095584 A1 * | 5/2006 | Deolaliker | H04L 67/16 709/240 |
| 2006/0123079 A1 * | 6/2006 | Sturniolo | H04W 80/045 709/203 |
| 2006/0173857 A1 | 8/2006 | Jackson | |
| 2007/0016639 A1 * | 1/2007 | Mukundan | G06Q 10/06 709/203 |
| 2007/0016869 A1 * | 1/2007 | Mukundan | G06F 9/4443 715/744 |
| 2007/0089118 A1 | 4/2007 | Aizaki | |
| 2007/0115818 A1 | 5/2007 | Bose | |
| 2007/0130574 A1 | 6/2007 | Gokhale et al. | |
| 2007/0276951 A1 | 11/2007 | Riggs et al. | |
| 2008/0133731 A1 | 6/2008 | Bradley et al. | |
| 2009/0113461 A1 | 4/2009 | Zhou et al. | |
| 2009/0183180 A1 | 7/2009 | Nelson | |
| 2009/0313026 A1 * | 12/2009 | Coffman et al. | 704/275 |
| 2010/0088150 A1 | 4/2010 | Mazhar et al. | |
| 2010/0145917 A1 | 6/2010 | Bone et al. | |
| 2010/0223394 A1 | 9/2010 | Sherer et al. | |
| 2010/0312863 A1 * | 12/2010 | Mohr | H04L 41/0813 709/220 |
| 2011/0225277 A1 | 9/2011 | Freimuth et al. | |
| 2011/0302569 A1 | 12/2011 | Kunze et al. | |
| 2012/0047231 A1 | 2/2012 | Herbeck et al. | |
| 2012/0066337 A1 | 3/2012 | Wu et al. | |
| 2012/0173485 A1 | 7/2012 | Kothule et al. | |
| 2013/0003875 A1 | 1/2013 | Abad Molina et al. | |
| 2013/0201875 A1 * | 8/2013 | Anantharam | H04L 41/044 370/255 |
| 2013/0347010 A1 | 12/2013 | Frick | |
| 2014/0025924 A1 | 1/2014 | Satoyama et al. | |
| 2014/0198686 A1 * | 7/2014 | Kamble | H04L 41/0806 370/255 |

OTHER PUBLICATIONS

Rob Van Der Linden, "Binding Mechanisms in Distributed Systems", APM.1281.00.01, Aug. 4, 1994, 20 pages.
IBM, "System and Method for Implementing Dynamic Remote Procedure Calls in Statically Compiled Languages", IP.com, Dec. 4, 2008, 2 pages.
Non-Final Office Action in related U.S. Appl. No. 13/585,587, mailed on Mar. 18, 2015; 13 pages.
Lewandowski, Scott M., "Frameworks for Component-Based Client/Server Computing", ACM Computing Surverys, vol. 30, No. 1, pp. 3-27, Mar. 1998.
Manassiev, et al., "Exploiting Distributed Version Concurrency in a Transactional Memory Cluster", PPoPP'06, New York, NY, pp. 198-208, Mar. 29-31, 2006.
Begnum, Kyrre M, "Managing Large Networks of Virtual Machines", 20th Large Installation System Administration Conference (LISA '06), pp. 205-214, 2006.
Kuppala, Lakshmi Prasanna, "Virtual Factory Simulation Using an Active Object Oriented Database System", Master's Thesis, University of Florida, 1998; 64 pages.
Verissimo, et al., "Chapter 1: Distributed Systems Foundations", Distributed Systems for System Architects, Kluwer Academic, pp. 4-20, 2001.
Rezayat, M., "The Enterprise-Web portal for life-cycle support", Computer-Aided Design, vol. 32, pp. 85-96, Elseiver Science Ltd., Sep. 2, 1999.
Non-Final Office Action in related U.S. Appl. No. 13/585,587, mailed on Sep. 17, 2015; 16 pages.
Winer, Dave, "XML-RPC Specification", Xmlrpc.scripting.com, Jun. 15, 1999, accessed Sep. 15, 2015; 6 pages.
"Remote Procedure Call (RPC) Authentication Numbers", lana.org, Apr. 15, 2009, accessed Sep. 15, 2015; 3 pages.
Thurlow, R., "RPC: Remote Procedure Call Protocol Specification Version 2", Sun Microsystems, tools.ietf.org, May 2009, accessed Sep. 15, 2015; 64 pages.
Srinivasan, R., "RPC: Remote Procedure Call Protocol Specification Version 2", Sun Microsystems, tool.ietf.org, Aug. 1995, accessed Sep. 15, 2015; 19 pages.
"RPC: Remote Procedure Call Protocol Specification Version 2", Sun Microsystems, toold.ietf.org, Jun. 1988, accessed Sep. 15, 2015; 26 pages.
Notice of Allowance in related U.S. Appl. No. 13/585,587, mailed on Mar. 31, 2016; 22 pages.
Crockford, D., "The application/json Media Type for JavaScript Object Notation (JSON)", RFC 4627, 2006; 10 pages.
"JSON-RPC 1.0 Specifications", Json-rpc.org, 2005; 3 pages.
"JSON-RPCE 2.0 Specification", Jsonrpc.org, 2007-2010; 7 pages.

* cited by examiner

REMOTE PROCEDURE CALL FOR A DISTRIBUTED SYSTEM

RELATED APPLICATION

This application is a continuation application claiming the benefit of the filing date of U.S. patent application Ser. No. 13/585,587, filed on Aug. 14, 2012, entitled "Remote Procedure Call for a Distributed System", the contents of which are incorporated by reference herein in their entirety.

FIELD OF THE INVENTION

The invention relates generally to data centers and data processing. More particularly, the invention relates to methods for managing distributed networked entities from a single point of management.

BACKGROUND

Data centers are generally centralized facilities that provide Internet and intranet services needed to support businesses and organizations. A typical data center can house various types of electronic equipment, such as computers, servers (e.g., email servers, proxy servers, and DNS servers), switches, routers, data storage devices, and other associated components. A given data center can have hundreds or thousands of such equipment interconnected in a distributed fashion. Directly managing each piece of equipment independently poses a considerable administrative burden.

SUMMARY

In one aspect, the invention features a method of managing a distributed system, comprising determining, by a master entity, a number of entities in the distributed system to be managed through the master entity. The number of entities includes a plurality of first-tier entities in communication with the master entity and zero, one, or more second-tier entities in indirect communication with the master entity through one of the first-tier entities. The master entity assigns a virtual slot for each first-tier entity and for each second-tier entity in the distributed system. Each virtual slot identifies one of the first-tier entities as a destination entity for requests sent to that virtual slot. The master entity receives a request from a management station to submit a command to manage a given one of the entities in the distributed system. The master entity determines one of the virtual slots associated with the request received from the management station, and sends an RPC (remote procedure call) request to the first-tier entity identified by the virtual slot.

In another aspect, the invention features a method comprising receiving, by a first-tier entity, an RPC request from a master entity in communication with the first-tier entity. The first-tier entity determines a virtual slot number from the RPC request and, in response to the virtual slot number, whether to perform a function call requested by the RPC request or to forward a request to perform the function call to a second-tier entity for which the first-tier entity is an RPC proxy.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Distributed systems described herein include a network of entities managed through a single point of management, designated the master entity. As used herein, an "entity" broadly refers to any type of electronic equipment, machine, system, sensor, transducer, or device capable of communicating over a network, wired or wireless link, or communication bus in accordance with a protocol in order to receive and respond to commands. Some of the managed entities are referred to as first-tier entities, being in direct communication with the master entity. Other managed entities are referred to as second-tier entities, being indirectly in communication with the master entity through one of the first-tier entities, the first-tier entities acting as proxies for such second-tier entities.

The master entity and managed entities are preferably members of the same group or cluster. The master entity provides a virtual slot for each first-tier and second-tier entity in the distributed system, the number of virtual slots thus corresponding to the total number of entities in the distributed system that can be managed through the master entity. Each virtual slot provides a mechanism by which to communicate with the first-tier and second-tier entity provided for that virtual slot. As described herein, each virtual slot points to one of the first-tier entities.

In general, administrators manage the first-tier and second-tier entities through the master entity, sending requests targeted to these entities to the master entity. The master entity forwards each request to the appropriate first-tier entity, identifying the appropriate first-tier entity from the virtual slot associated with the administrator's request. Depending on the target of the request, the appropriate first-tier entity can perform the requested function or forward the request to a targeted second-tier entity for which the first-tier entity acts as proxy.

To forward administrator requests directly to the first tier of managed entities, the master entity uses an RPC (remote procedure call) mechanism. To initiate RPC requests, the master entity runs an RPC client. The RPC client identifies the destination first-tier entity for a given RPC request based on the virtual slot associated with the target entity (which can be a first-tier or second-tier entity). Each RPC request contains the identity of the virtual slot. To process RPC requests, each first-tier entity runs an RPC server. The RPC server of each first-tier entity is adapted to receive RPC requests intended for itself and for any second-tier entities managed by that first-tier entity, using the virtual slot of each received RPC request to make the determination.

Advantageously, use of the RPC mechanism and virtual slots can make any large distributed system readily scalable. The master entity can manage any number of first-tier and second-tier entities by allocating a virtual slot to each entity. The RPC mechanism effectively transforms a distributed system comprised of multiple entities networked in a variety of ways into a single virtual system centrally managed through a single master entity. Although described hereafter in connection with packet-based switches, it is to be understood that the principles extend to other types of entities.

Figure 1:
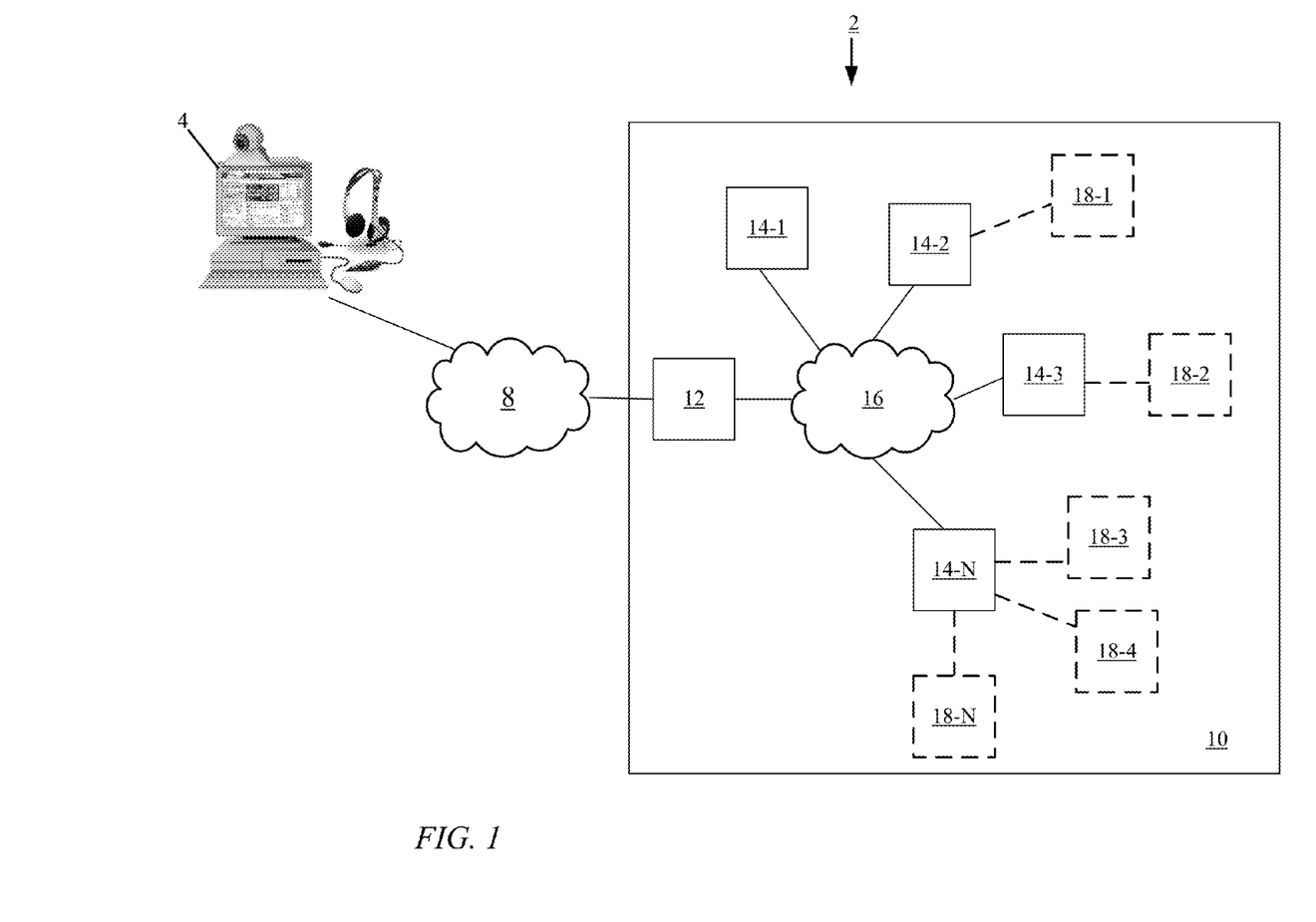
FIG. 1 is a diagram of an embodiment of a network with a plurality of entities including a single master entity, a first tier of managed entities, and a second tier of managed entities.

FIG. 1 shows an embodiment of a networking environment 2 including a management station 4 and a server 6 in communication with a data center 10 over a network 8. In general, the server 6 is a computer (or group of computers) that provides one or more services to the data center 10, examples of which include, but are not limited to, email servers, proxy servers, and DNS servers. Embodiments of the network 8 include, but are not limited to, local-area networks (LAN), metro-area networks (MAN), and wide-area networks (WAN), such as the Internet or World Wide Web. In one embodiment, the network 8 is configured as an Layer 2 (L2) VLAN. Although shown outside of the data center 10, either (or both) of the management station 4 and server 6 may be considered part of the data center 10. The data center 10 may be embodied at a single site or distributed among multiple sites.

In general, the data center 10 is a facility that houses various computers, routers, switches, and other associated electronic equipment in support of applications and data that are integral to the operation of a business, organization, or other entities. In this illustrative example, the data center 10 includes a packet-based master switch 12 in communication with a plurality of first-tier packet-based switches 14-1, 14-2, 14-3, 14-N (generally, 14) over a network 16. Embodiments of the switches 14 include, but are not limited to, core switches, access switches, fabric cards, line cards, and management modules in a physical chassis switch. The network 16 is an abstraction of the topology interconnecting the switches 12, 14. Examples of interconnection topologies include, but are not limited to, daisy chains, partial and full meshes, stars, and stacked. In one embodiment, the switches 12, 14 communicate over 10 Gb Ethernet links (e.g., according to the IEEE 802.Qgb standard).

Each of the first-tier switches 14 can be connected to one or more second-tier switches 18 (for example, switch 14-2 is connected to switch 18-1, and switch 14-N is connected to switches 18-3, 18-4, 18-N). A stacked fabric chassis is an example embodiment of a first-tier (top of the rack) switch in communication with a plurality of second-tier switches. The switches 12, 14, 18 together form a single distributed fabric system. The number of switches in the distributed fabric system can range in the hundreds or thousands.

Each of the switches 12, 14, 18 is preferably a member of the same cluster. Generally, each cluster has a master (or controller) switch, one or more standby or back-up switches, and one or more follower switches. Under normal operation, each standby switches operates like a follower switch, except that a given standby switch can become the master switch in the event the current master switch fails. The data center 10 can have more than one cluster, although each switch 12, 14, 18 can be the member of one cluster only.

In the data center 10, the functionality occurs on three planes: a management plane, a control plane, and a data plane. The management of the cluster, such as configuration management, runtime configuration management, presentation of information (show and display), graph generation, and handling SNMP (Simple Network Management Protocol) requests, occurs on the management plane. The control plane is associated with those functions involving network signaling and control. The data plane manages data flow. In the data center 10, the functionality of the management plane is centralized at the master switch 12, and the functionality of the control plane and data plane is distributed among the switches 12, 14 (in addition to their own control plane, first-tier switches 14 manage the control plane of their second-tier switches, if any).

During operation of the data center 10, a special software flag is enabled on each switch 12, 14 in a group or cluster. In one embodiment, the switches 12, 14 exchange information with each other and elect the master switch 12. Some of the first-tier switches 14 become standby switches, and the rest of the switches 14 become followers, or members of the cluster. One example implementation of an information exchange and master switch election is described in U.S. patent application Ser. No. 13/364,947, filed Feb. 2, 2012, titled "Switch Discovery Protocol for a Distributed Fabric System," the entirety of which is incorporated by reference herein. From the exchanged information, the master switch 12 discovers the paths to the first-tier switches 14, and learns which, if any, of the first-tier switches 14 are proxies for one or more second-tier switches 18. In addition, the master switch 12 assigns virtual slots to the switches 14, 18, one virtual slot for each first-tier switch 14 and one virtual slot for each second-tier switch 18. Each virtual slot points to one of the first-tier switches 14. For example, a virtual slot assigned to the first-tier switch 14-3 points to the first-tier switch 14-3, and a virtual slot assigned to the second-tier switch 18-2 points to the first-tier switch 14-3, which is the proxy of the second-tier switch 18-2. The master switch 12 shares the virtual slot assignments with the first-tier switches 14.

The management station 4 connects directly (point-to-point) or indirectly to the master switch 12 of the data center 10 over one of a variety of connections, such as standard telephone lines, digital subscriber line (DSL), asynchronous DSL, LAN or WAN links (e.g., T1, T3), broadband connections (Frame Relay, ATM), and wireless connections (e.g., 802.11(a), 802.11(b), 802.11(g), 802.11(n)). The management station 4 uses a particular IP address to communicate with the master switch 12 (this same IP address is used to communicate with any standby switch that assumes the role of the master switch). For instance, in the event the current master switch fails, and a standby switch takes over the master role, the management station 4 communicates with the new master switch using the same IP address.

Using a network protocol, such as Telnet or SNMP, the management station 4 can access a command-line interface (CLI) of the master switch 12. The management station 4 provides a centralized point of administration for managing and controlling the switches of the distributed fabric system. A graphical user interface (GUI) application can execute on the management station 4 to provide the network administrator with a view of the entire network topology of the distributed fabric system. An example of such a GUI application is Blade Harmony Manager® provided by IBM Corporation of Armonk, N.Y. To the administrator, all of the switches 12, 14, 18 appear as part of single virtual chassis, with each of the switches 12, 14, 18 appearing to occupy a virtual slot. In one embodiment, the master switch 12 shows itself as being in slot 1 of the whole virtual chassis, and the other switches 14, 18 occupying other numbered virtual slots.

Through the management station 4, a network administrator of the data center 10 communicates with the master switch 12 in order to manage all of the switches 14, 18 from a single location. The administrator can submit a variety of management requests to and through the master switch 12 including, but not limited to, requesting information, setting parameter values, enabling and disabling ports of a given switch, and powering down or booting a given switch. For example, the administrator can submit a request to the master switch 12 directed to configure port no. 5 of the switch located (virtually) in virtual slot no. 7 (i.e., port 7:5).

In response to this request from the management station 4, the master switch 12 issues a RPC request to a destination first-tier switch 14 identified by the virtual slot number. In response to the RPC request, the destination first-tier switch 14 determines if the RPC request is directed to it or to a second-tier switch 18 connected to the destination first-tier switch 14. If it is the intended target, the destination first-tier switch 14 performs the requested function and replies to the master switch 12. If a second-tier switch 18 is the intended target, the destination first-tier switch 14 communicates with that second-tier switch 18 using any standard or proprietary communication protocol. After receiving a response from the second-tier switch 18 indicating performance of the requested function, the destination first-tier switch 14 responds to the master switch 12 in accordance with the RPC protocol.

Figure 2:
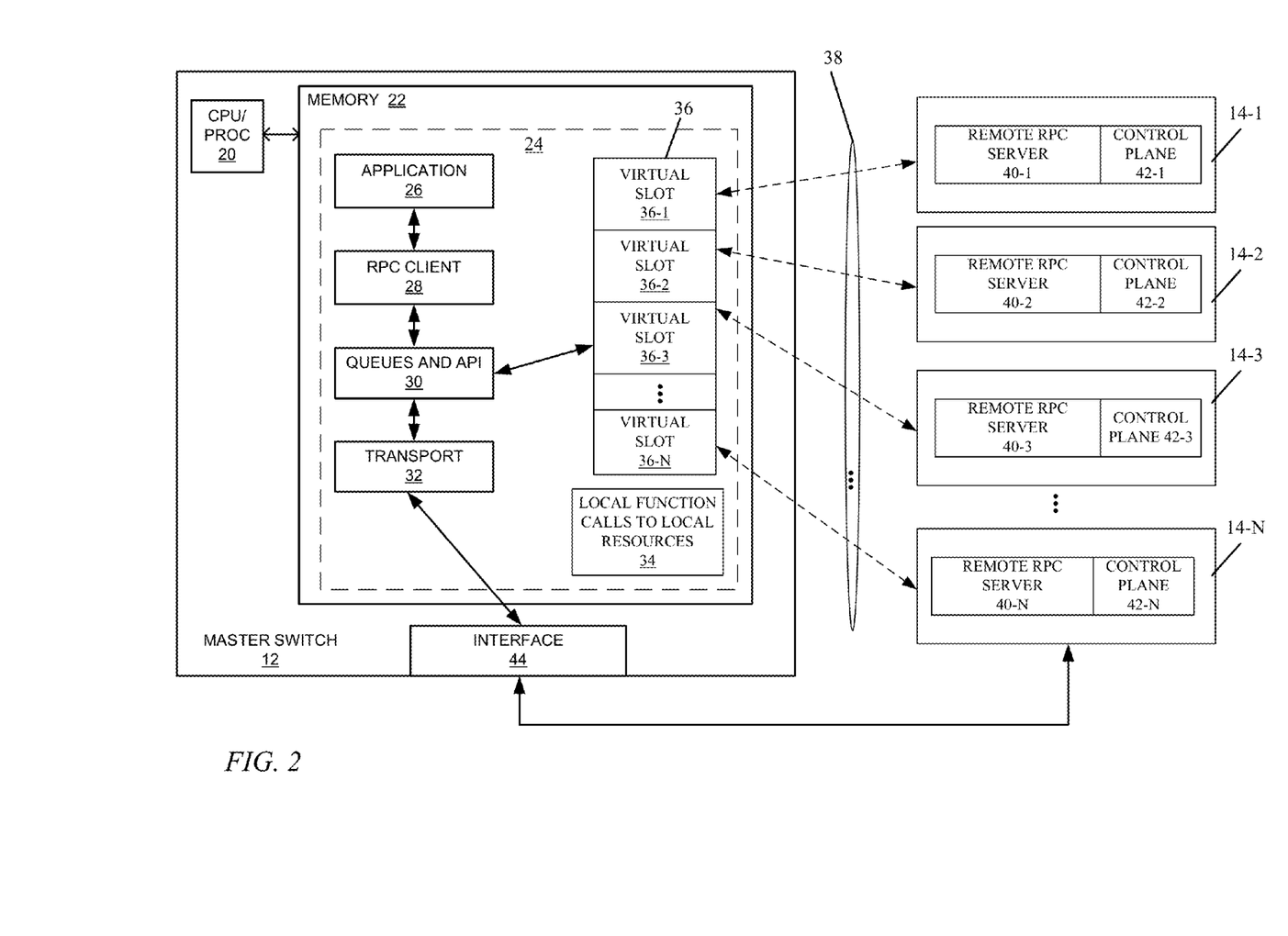
FIG. 2 is a block diagram of an embodiment of the master entity including an RPC client and a virtual slot table used by the RPC client to identify the destination entities of RPC requests.

FIG. 2 shows an embodiment of the data center 10 with the master switch 12 in communication with the first-tier switches 14. The master switch 12 has hardware and software common to each of the switches 12, 14, including a processor 20 in communication with memory 22, and software 24 stored in the memory 22. The software 24 comprises a set of software components including an application layer 26, an RPC client 28, an API layer 30, a transport layer 32, and local function calls 34 to access local resources of the switch 12. The master switch 12 also maintains a table 36 of virtual slots. Each virtual slot of the table 36 points to one of the remote first-tier switches 14 and contains information (e.g., address, path name) for communicating with that remote switch 14. Dashed arrows 38 represent the associations between virtual slots and remote switches 14. For example, the first virtual slot 36-1 is associated with the remote switch 14-1, the second virtual slot 36-2 is associated with the remote switch 14-2, the third virtual slot 36-2 is associated with the remote switch 14-3, and the Nth virtual slot 36-N is associated with the Nth remote switch 14-N. The master switch 12 also includes an interface 44 through which the master switch 12 sends RPC requests to the remote switches 14 of the first tier.

The application layer 26 is a program or process that calls the RPC client 28 to initiate an RPC request. In general, the RPC client 28 provides a mechanism for performing functions on remote switches 14. To initiate an RPC request, the RPC client 28 calls the API layer 30. The API layer 30 prepares the data structure of the RPC request, using a virtual slot number (of an incoming administrator request) to access the virtual slot table 36 and acquire the ID of the destination first-tier switch 14 associated with that virtual slot. After constructing the RPC request, the API layer 30 routes the RPC request to the transport layer 32 to determine the protocol used for transmitting the RPC request to the remote switch. Examples of possible transport protocols for conveying the RPC request include, but are not limited to, TCP (Transmission Control Protocol), HTTP (Hypertext Transport Protocol), and UDP (User Datagram Protocol).

Each of the remote first-tier switches 14 also includes an RPC server 40 and its own control plane 42. For example, the first-tier switch 14-1 has the RPC server 40-1 and control plane 42-1. The RPC server 40 responds to RPC requests received from the master switch 12, executing local function calls that can affect the performance of its own control plane 42 and sending RPC responses to the master switch 12.

Figure 3:
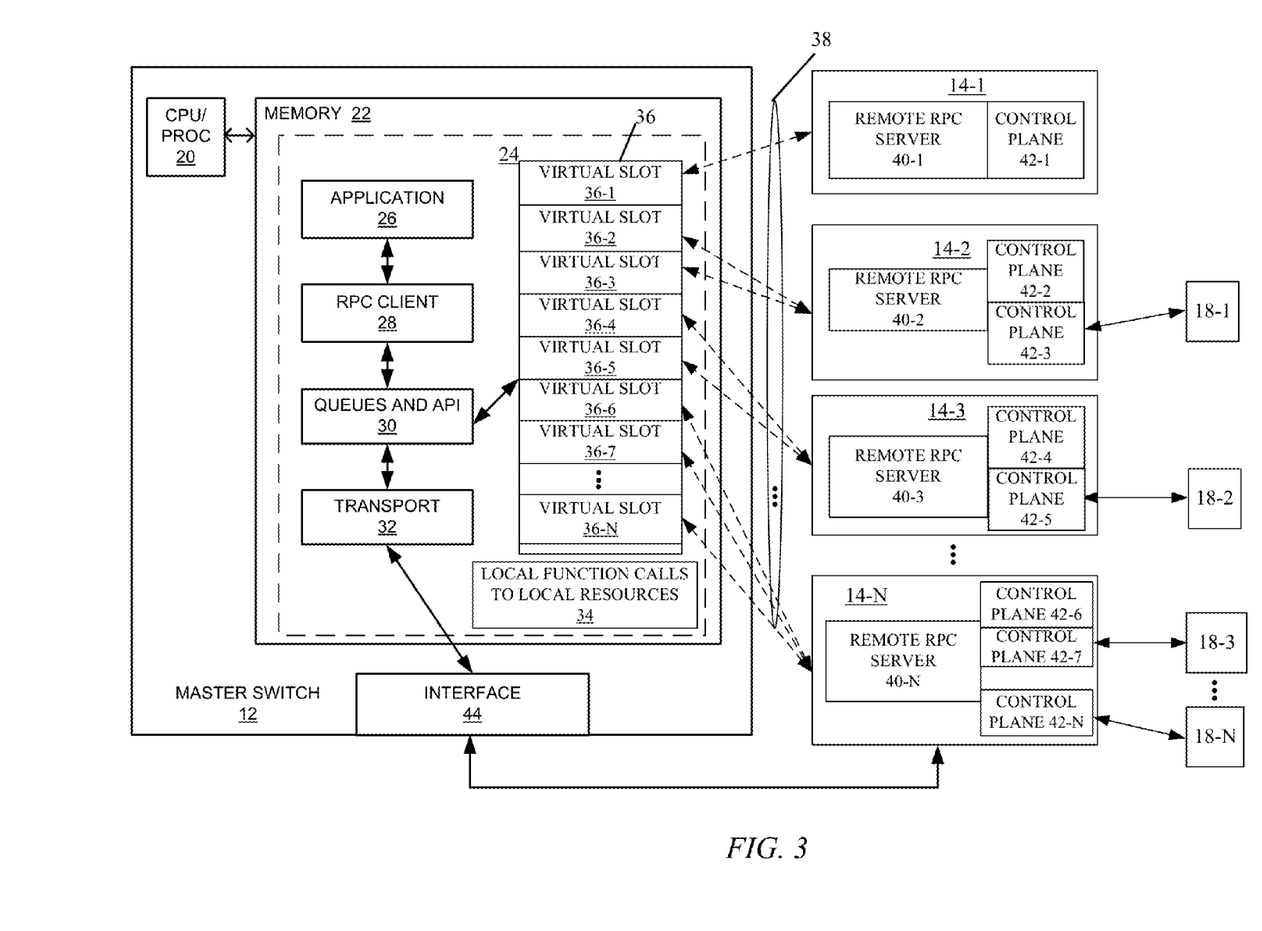
FIG. 3 is a block diagram of the embodiment of the master entity of FIG. 2, wherein one or more of the destination entities operate as an RPC proxy for one or more second tier entities.

FIG. 3 shows another embodiment of the data center 10 with the master switch 12 directly in communication with the first-tier switches 14-1, 14-2, 14-3, and 14-N and indirectly in communication with the second-tier switches 18-1, 18-2, 18-3, 18-N. In this example, the first-tier switch 14-1 runs an RPC server 40-1 and manages its own control plane 42-1; the first-tier switch 14-2 runs an RPC server 40-2 and manages its own control plane 42-2 and the control plane 42-3 of the second-tier switch 18-1, the first-tier switch 14-3 runs an RPC server 40-3 and manages its own control plane 42-4 and the control plane 42-5 of the second-tier switch 18-2; and the first-tier switch 14-N runs an RPC server 40-4 and manages its own control plane 42-6, and the control planes 42-7, 42-N of the second-tier switches 18-3, 18-N. In this example, the first-tier switch 14-2 is an RPC proxy for the second-tier switch 18-1, the first-tier switch 14-3 is an RPC proxy for the second-tier switch 18-2, and the first-tier switch 14-N is an RPC proxy for the second-tier switches 18-3 through 18-N.

The virtual slot table 36 includes an entry for each first-tier switch 14 and second-tier switch 18. Each virtual slot 36 identifies one of the first-tier switches 14 as a destination of RPC requests directed to that virtual slot. For example, both virtual slots 36-2 and 36-3 identify the first-tier switch 14-2; this implies that RPC requests addressed to both virtual slots 36-2 and 36-3 are sent to the first-tier switch 14-2 for processing by its RPC server 40-2. As another example, virtual slots 36-6, 36-7, 36-N identify the first-tier switch 14-N, indicating that RPC requests that are addressed to virtual slots 36-6, 36-7, 36-N are sent to the first-tier switch 14-N for processing by its RPC server 40-N.

Figure 4A:
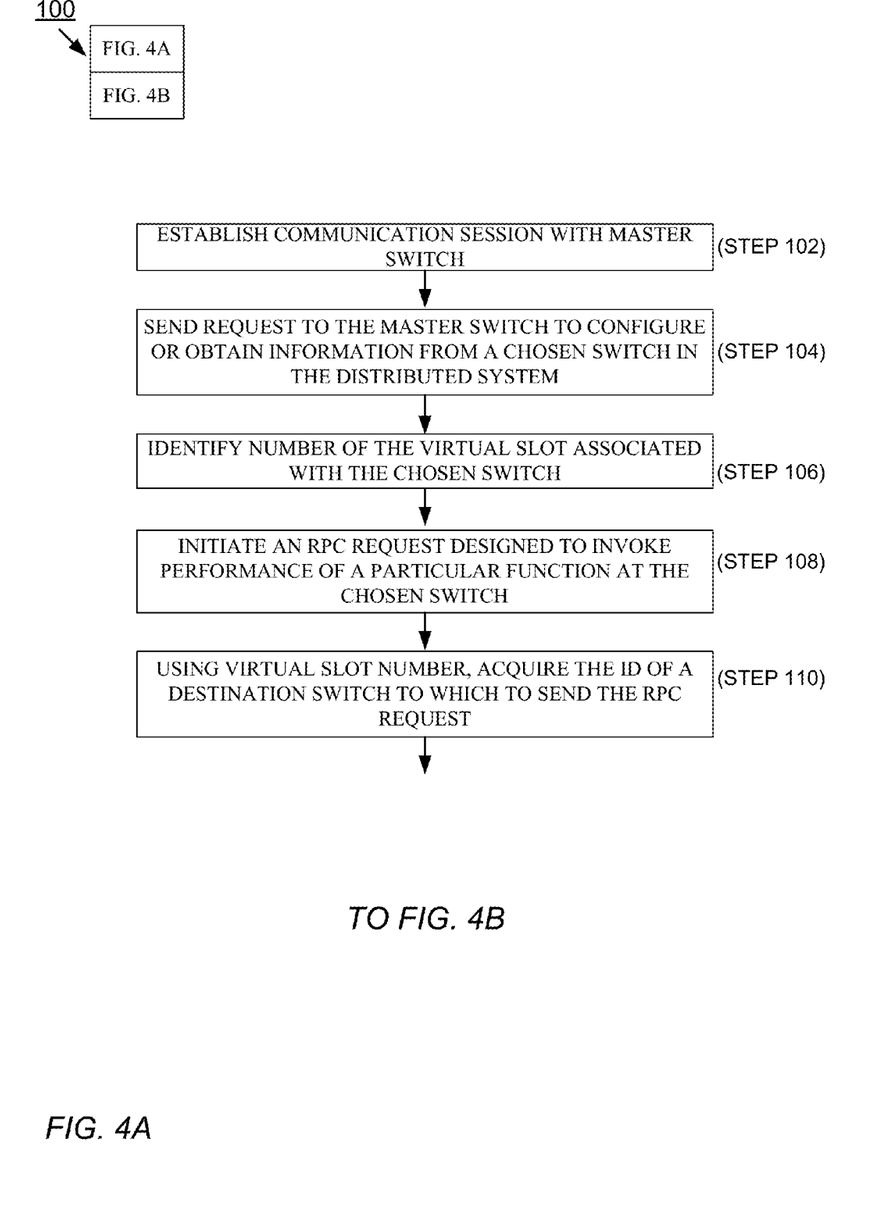
FIG. 4A and FIG. 4B are a flow diagram of an embodiment of a process for managing first-tier and second-tier entities through the master entity.
Figure 4B:
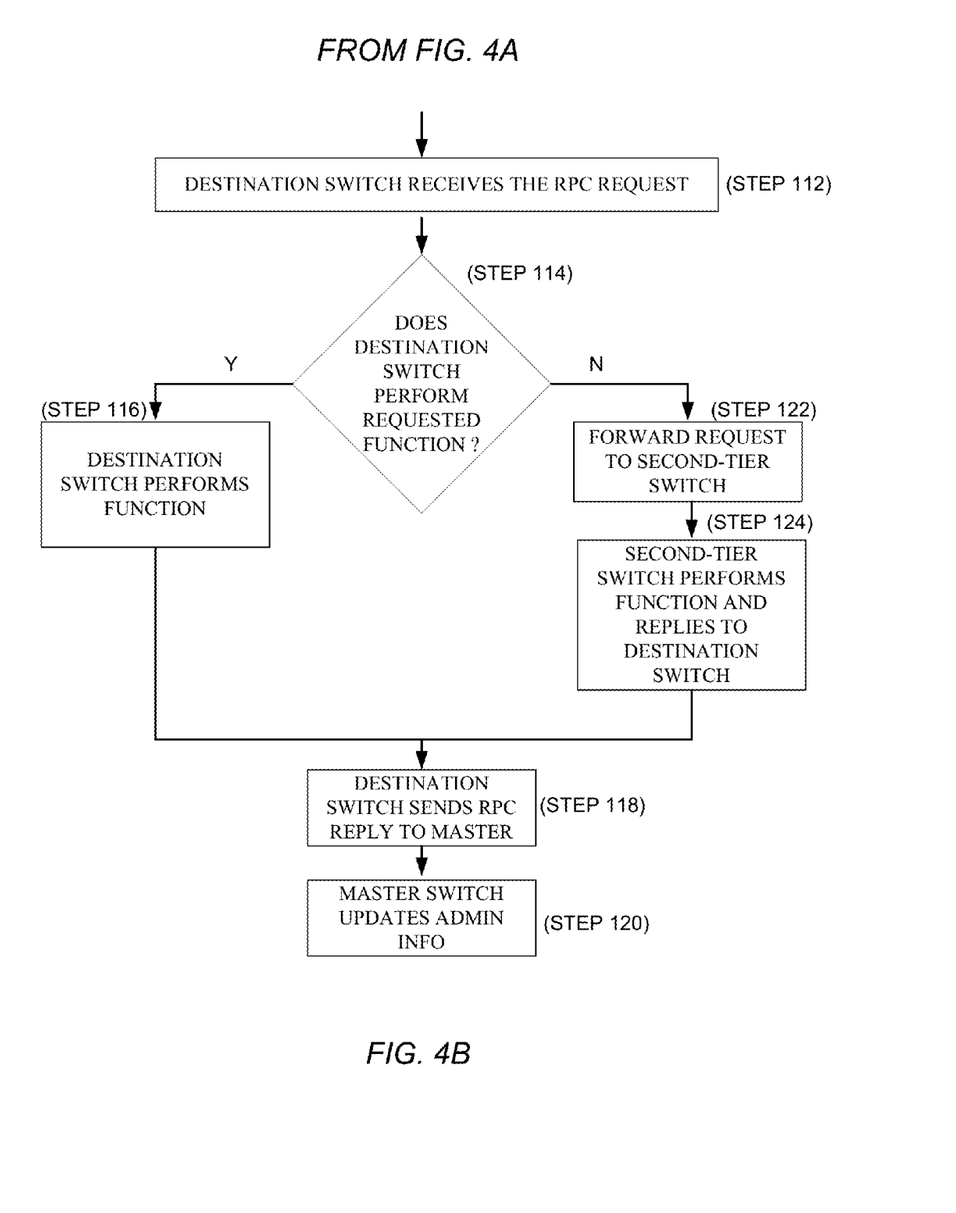

FIG. 4A and FIG. 4B show an embodiment of a process 100 for centrally managing a distributed system having multiple networked entities. From the management station 4, an administrator establishes (step 102) a communication session (e.g., SNMP) with the master switch 12. The interface presented at the management station 4 presents all of the switches of the distributed system as though they are members of a single fabric chassis, each member occupying a slot of the chassis. Through the interface, the administrator can choose one of the switches for purposes of inspection or configuration, sending (step 104) a request to the master switch 12 designed to configure or obtain information from the chosen switch.

The master switch 12 examines (step 106) the administrator's request to identify the number of the virtual slot associated with the chosen switch. The RPC client 28 of the master switch 12 initiates (step 108) an RPC request designed to invoke performance of a particular function at the chosen switch. The API layer 30 of the master switch 12 uses the virtual slot number associated with the administrator's request to access the virtual slot table 36 and to acquire (step 110) an ID of a destination switch (i.e., the destination of the RPC request, which is a first-tier switch). With this acquired information, the API layer 30 prepares the RPC request, which includes an opcode corresponding to the function to be performed by the chosen switch and the virtual slot number. The transport layer 32 prepares the RPC request for transmission over the network 16 to this identified destination switch.

The identified destination switch (i.e., a first-tier switch 14) receives (step 112) the RPC request. From the virtual slot number in the RPC request, the RPC server 40 of the first-tier switch 14 determines (step 114) whether the first-tier switch 14 is the particular switch intended to perform the function identified in the RPC request. If this is so determined, the RPC server 40 of the first-tier switch 14 decodes the opcode in the request, performs (step 116) the corresponding function, prepares an RPC reply, and sends (step 118) the RPC reply back to the master switch 12. The master switch 12 updates (step 120) the information presented to the management station to reflect the result of the performed function.

Alternatively, the RPC server 40 of the first-tier switch 14 can determine (step 114) from the virtual slot number that the RPC request is intended for a second-tier switch 18 for which the first-tier switch 14 is its RPC proxy. The first-tier switch 14 runs a proxy agent associated with that second-tier switch 18, sending (step 122) a request to the second-tier switch 18 to perform the requested function. The request can be in accordance with any communication protocol.

After the second-tier switch 18 performs (step 124) the function and replies to the request from the first-tier switch 14, the RPC server 40 of the first-tier switch 14 prepares and transmits (step 118) an RPC reply to the master switch 12. In response to this RPC reply from the first-tier switch 14, the master switch 12 updates (step 120) the information presented to the administrator to reflect the function performed by the chosen switch.

As will be appreciated by one skilled in the art, aspects of the present invention may be embodied as a system, method, and computer program product. Thus, aspects of the present invention may be embodied entirely in hardware, entirely in software (including, but not limited to, firmware, program code, resident software, microcode), or in a combination of hardware and software. All such embodiments may generally be referred to herein as a circuit, a module, or a system. In addition, aspects of the present invention may be in the form of a computer program product embodied in one or more computer readable media having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wired, optical fiber cable, radio frequency (RF), etc. or any suitable combination thereof.

Computer program code for carrying out operations for aspects of the present invention may be written in any combination of one or more programming languages, including an object oriented programming language such as JAVA, Smalltalk, C++, and Visual C++ or the like and conventional procedural programming languages, such as the C and Pascal programming languages or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may execute entirely on a user's computer, partly on the user's computer, as a stand-alone software package, partly on the user's computer and partly on a remote computer or entirely on a remote computer or server. Any such remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Aspects of the described invention may be implemented in one or more integrated circuit (IC) chips manufactured with semiconductor-fabrication processes. The maker of the IC chips can distribute them in raw wafer form (on a single wafer with multiple unpackaged chips), as bare die, or in packaged form. When in packaged form, the IC chip is mounted in a single chip package, for example, a plastic carrier with leads affixed to a motherboard or other higher level carrier, or in a multichip package, for example, a ceramic carrier having surface and/or buried interconnections. The IC chip is then integrated with other chips, discrete circuit elements, and/or other signal processing devices as part of either an intermediate product, such as a motherboard, or of an end product. The end product can be any product that includes IC chips, ranging from electronic gaming systems and other low-end applications to advanced computer products having a display, an input device, and a central processor.

Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It is be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed.

While the invention has been shown and described with reference to specific preferred embodiments, it should be understood by those skilled in the art that various changes in form and detail may be made therein without departing from the spirit and scope of the invention as defined by the following claims.

What is claimed is:

1. A method of managing a distributed system, comprising:
   providing a master switch including a microprocessor, a memory storing an RPC (Remote Procedure Call) client and a virtual slot table having a plurality of virtual slots;
   determining, by a master switch, a number of entities in the distributed system to be managed through the master switch, the number of entities including:
      a plurality of first-tier switches in direct communication with the master switch, such that each first-tier switch does not communicate through any intervening entities when communicating with the master switch; and one or more second-tier switches in indirect communication with the master switch through one of the first-tier switches, the one or more second-tier switches being directly connected to the one of the first-tier switches; wherein the master switch provides a single access point through which an administrator can submit commands to manage all of the first and second tier switches;
   assigning, by the master switch, a virtual slot for each first-tier switch and for each second-tier switch in the distributed system, each virtual slot identifying one of the first-tier switches as a destination entity for requests sent to that virtual slot;
   receiving, by the master switch, a request from a management station to submit a command to manage a given one of the entities in the distributed system;
   determining, by the master switch, one of the virtual slots associated with the request received from the management station; and
   running, by the microprocessor of the master switch, the RPC (remote procedure call) client to submit an RPC request to the first-tier switch identified by one of the virtual slots.

2. The method of claim 1, comprising:
   receiving, by the first-tier switch identified by the one of the virtual slots, the RPC request from the master switch;
   determining, by the first-tier switch, a virtual slot number from the RPC request, and in response,
   determining, by the first-tier switch, whether to perform a function call requested by the RPC request or to forward a request to perform the function call to a second-tier switch for which the first-tier switch acts as an RPC proxy.

3. The method of claim 1, further comprising establishing, by the master switch, a communication session with the management station during which the master switch receives the request.

4. The method of claim 1, further comprising communicating, by the master switch, over an Ethernet link with the first-tier switch identified by the one of the virtual slots.

5. A method, comprising:

providing a master switch including a microprocessor, a memory storing an RPC (Remote Procedure Call) client and a virtual slot table having a plurality of virtual slots;

running, by the microprocessor of the master switch, the RPC client to submit an RPC request to a first-tier switch of a plurality of first-tier switches in direct communication with the master switch, over a communication network;

determining, by the first-tier switch, a virtual slot number from the RPC request;

determining, by the first-tier switch, in response to the virtual slot number, whether to perform a function call requested by the RPC request or to forward a request to perform the function call to a second-tier switch for which the first-tier switch is an RPC proxy; and managing, by a first-tier switch, a control plane of a second tier switch of a plurality of second-tier switches which communicate with the master switch only through the first-tier switch; wherein the master switch provides a single access point through which an administrator can submit commands to manage all of the first and second tier switches.

6. The method of claim 5, further comprising:

receiving, by the first-tier switch, a reply from the second-tier switch to the request; and sending, by the first-tier switch, an RPC reply to the master switch in response to the reply received from the second-tier switch.

7. The method of claim 5, wherein the first-tier switch receives the RPC request from the master switch over an Ethernet link.

* * * * *